Oct. 25, 1960    H. DE VALLE ARIZPE    2,957,695
TARGET PROJECTION APPARATUS
Filed May 22, 1956    7 Sheets-Sheet 1
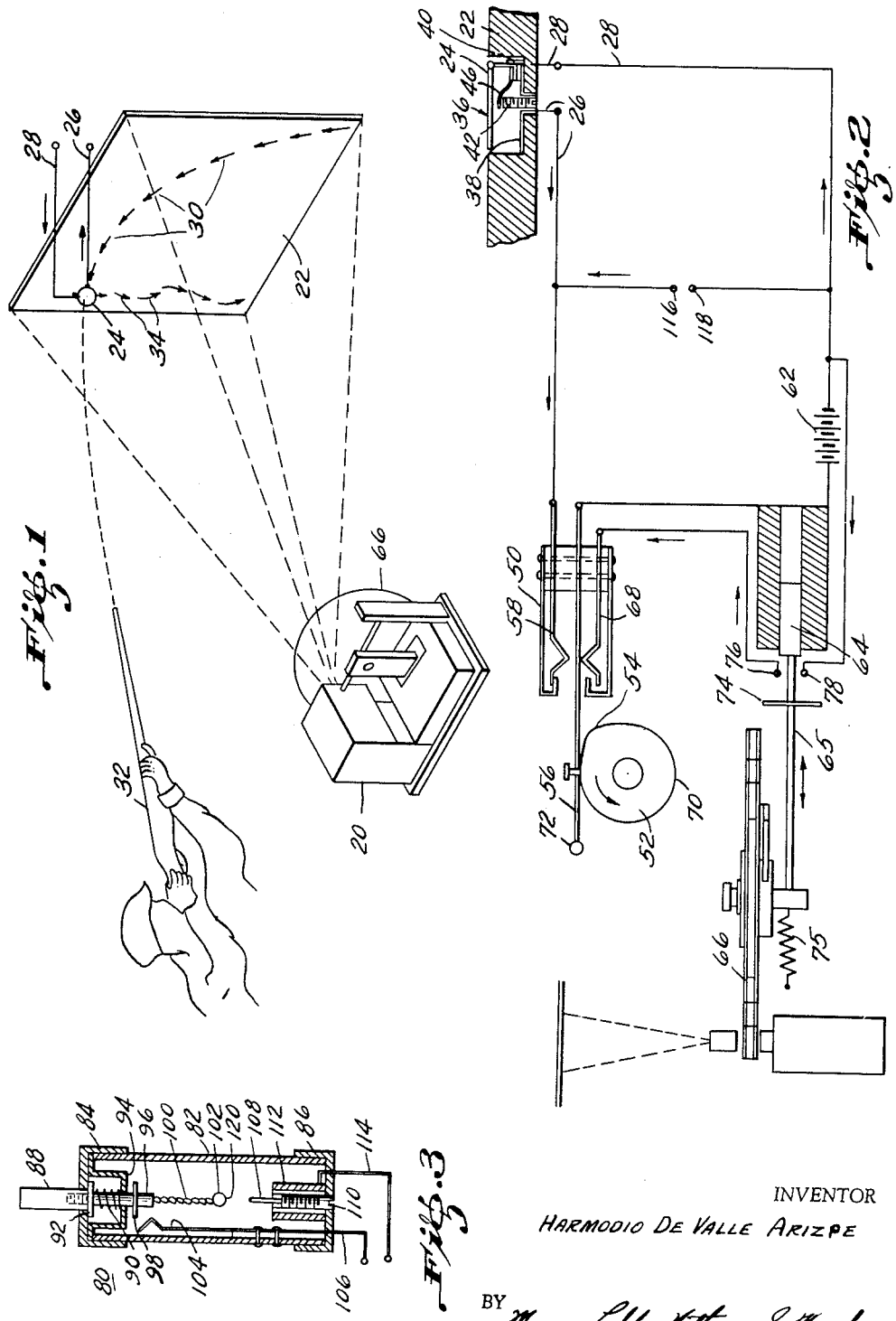
INVENTOR
HARMODIO DE VALLE ARIZPE
BY
ATTORNEY

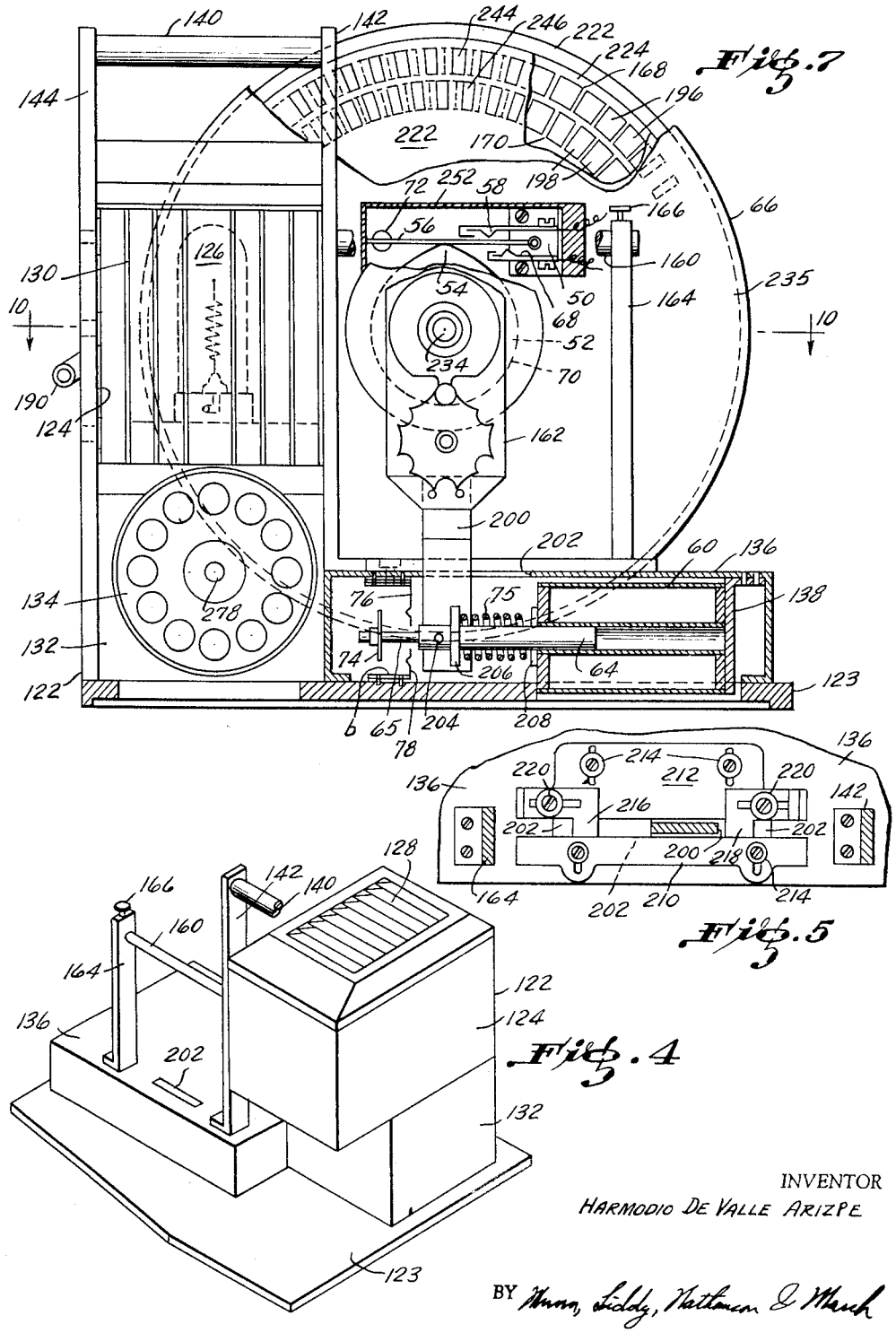

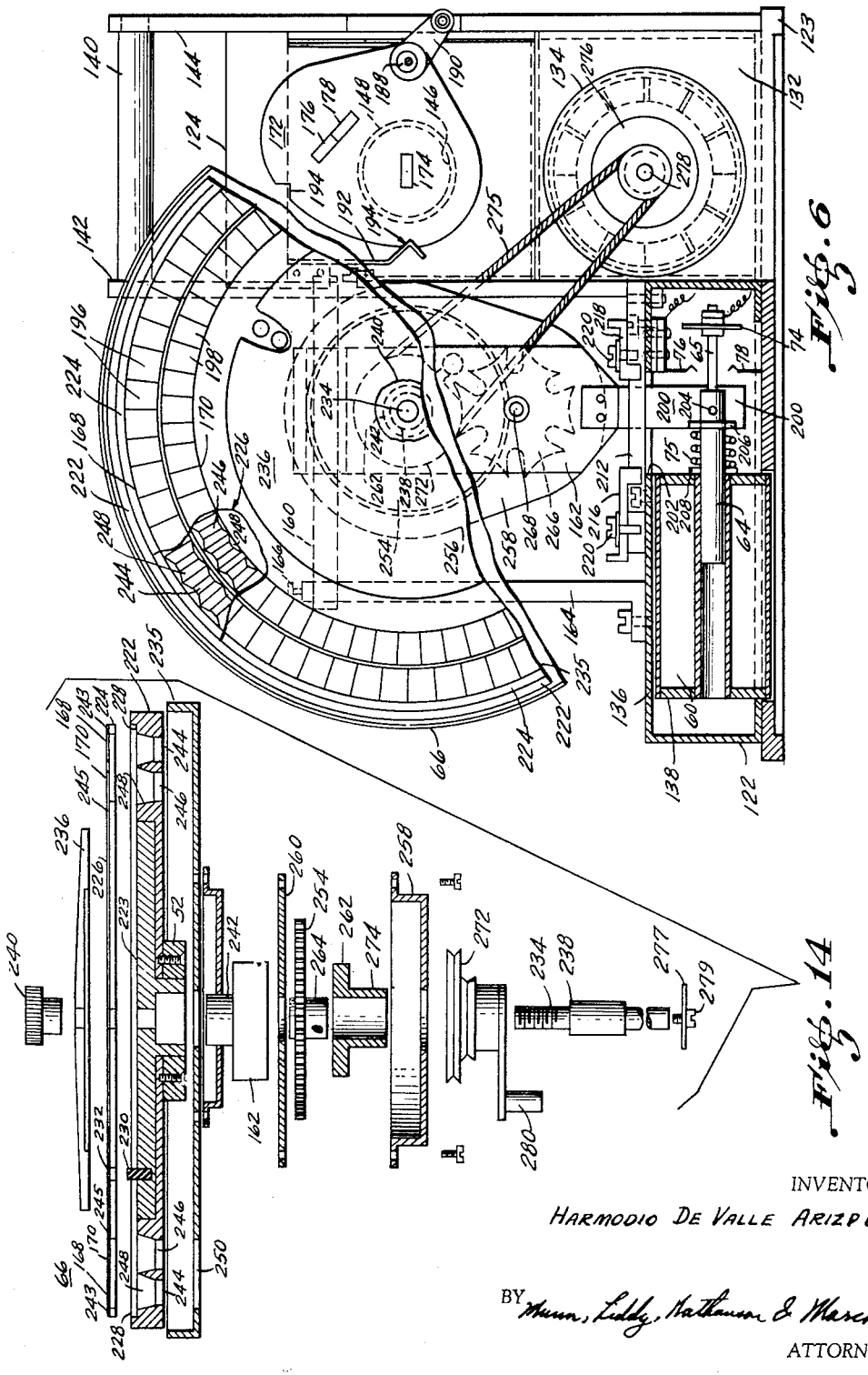

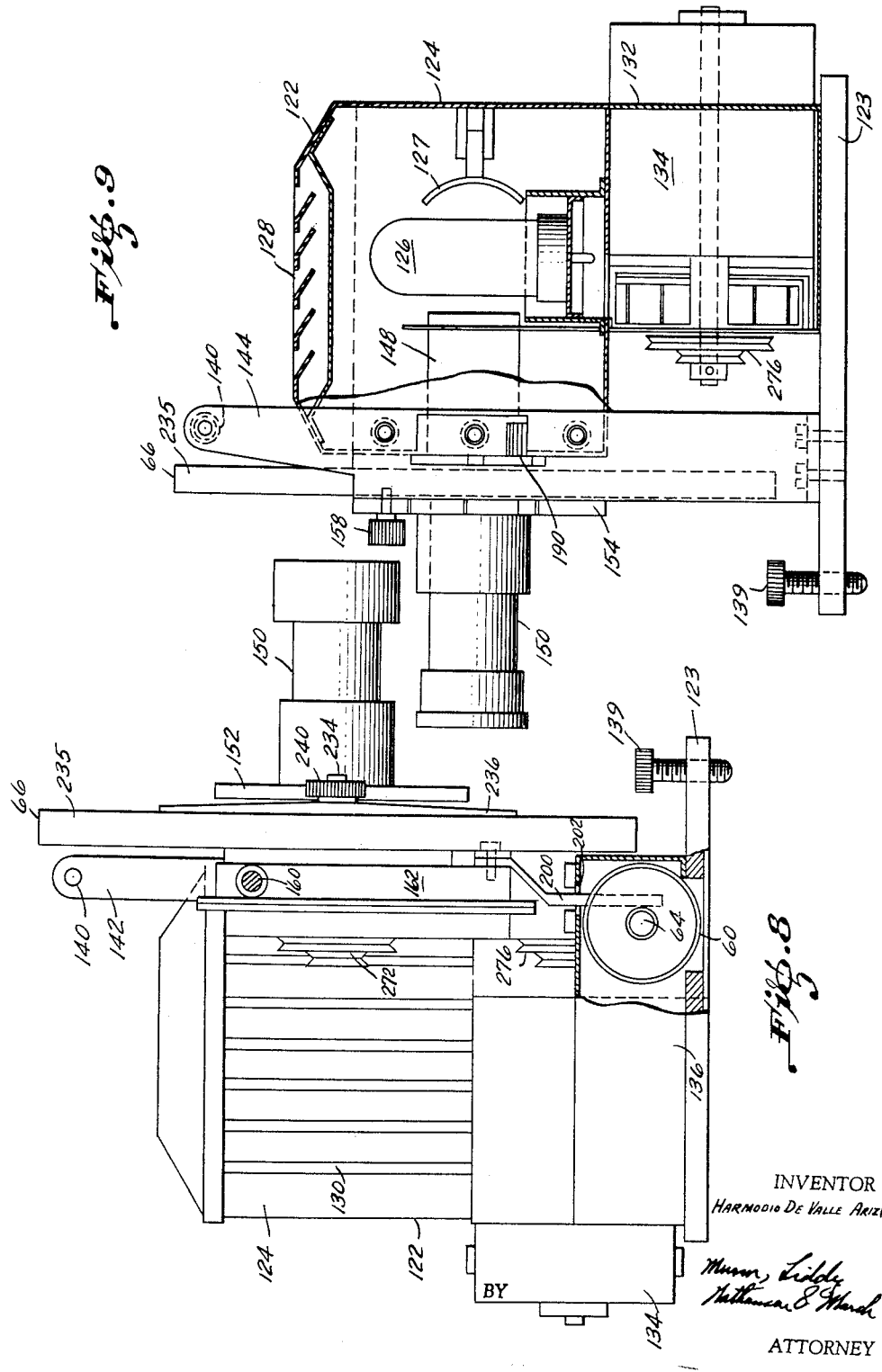

Oct. 25, 1960     H. DE VALLE ARIZPE     2,957,695
TARGET PROJECTION APPARATUS
Filed May 22, 1956     7 Sheets-Sheet 5
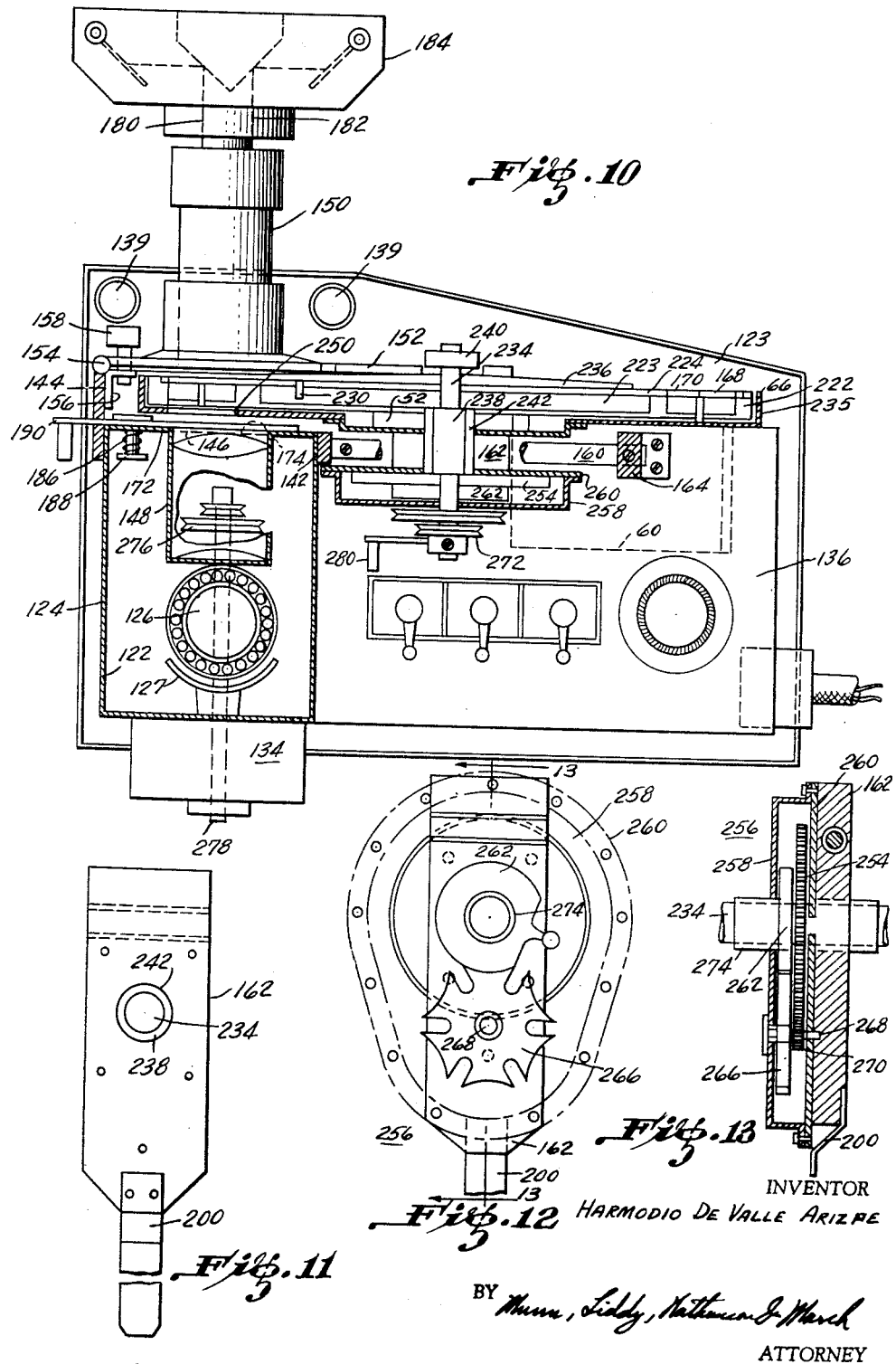
INVENTOR
HARMODIO DE VALLE ARIZPE
ATTORNEY

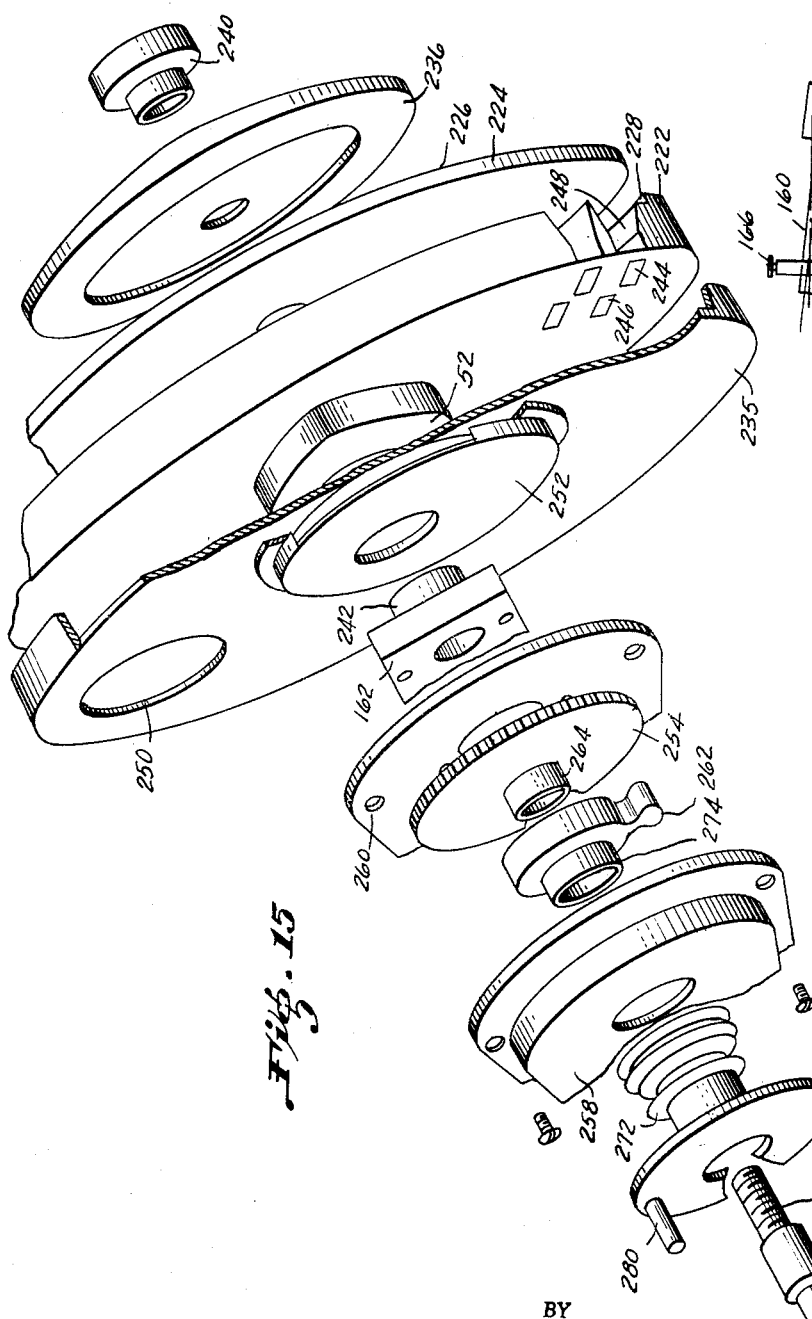

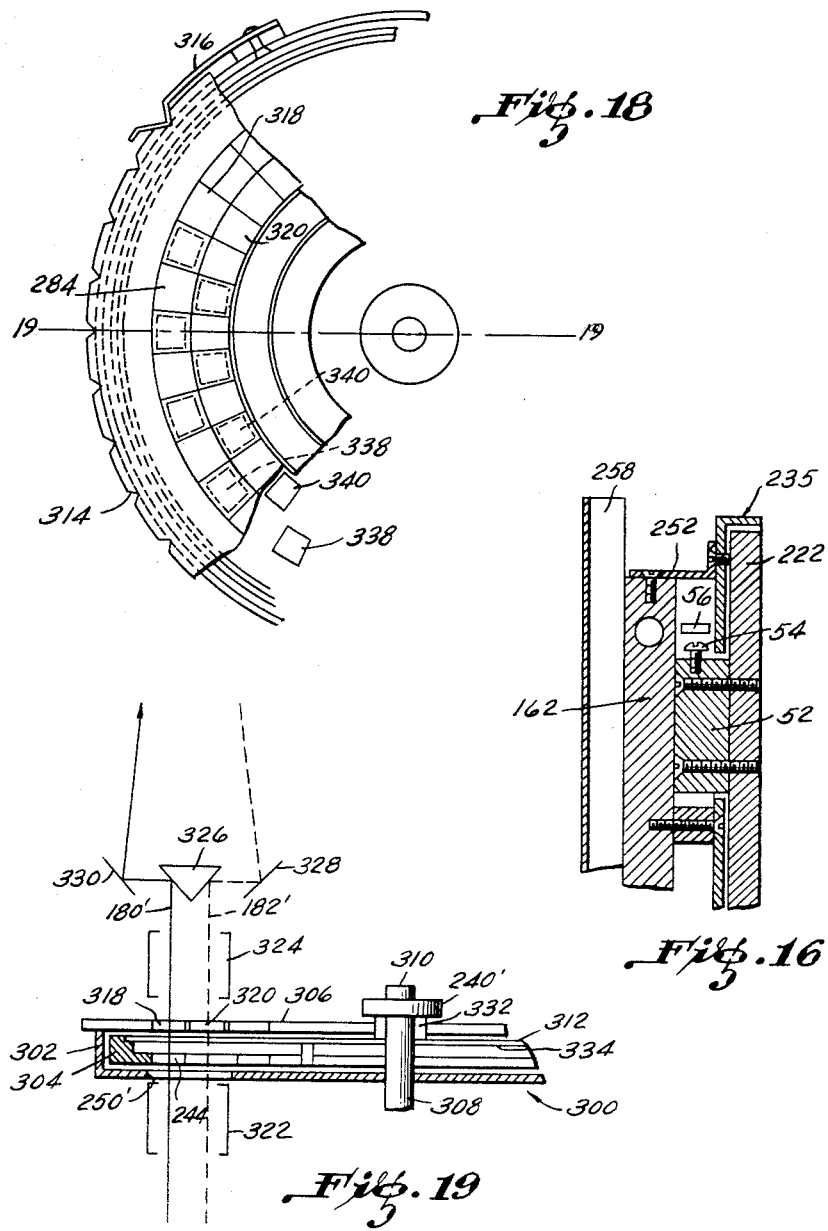

United States Patent Office 2,957,695
Patented Oct. 25, 1960

2,957,695

TARGET PROJECTION APPARATUS

Harmodio de Valle Arizpe, Rumania 618B,
Colonia Portales, Mexico City, Mexico

Filed May 22, 1956, Ser. No. 586,557

17 Claims. (Cl. 273—105.1)

The present invention relates to marksmanship or other skill indicating apparatus and more particularly to mechanism therewith for optically projecting successive images and for generating movement therebetween responsive to the accuracy of said marksmanship or other skill.

Amusement devices for testing marksmanship or other skills, in which an image or target is projected onto a screen, are well known. Heretofore, such devices for the most part merely have indicated when a simulated shooting or other aiming device was properly aligned with the projected image. Such alignment was indicated by flashing lights, hits and misses scoring mechanism, or similar visual or audible means. Other arrangements provided means for marking, with a needle or the like, the photographic transparencies or film optically projected upon a targent screen in accordance with the alignment of the aiming device. Eventually such marking resulted in the loss and replacement of the film and provided only an extremely brief indication of the relative accuracy of the marksmanship. Still other apparatus involved the projection of a fixed image from a movably mounted projector having complicated and cumbersome mechanism associated therewith for causing the image to traverse the target screen. In those amusement or marksmanship and skill indicating devices utilizing an optically projected moving image no arrangement has hitherto been known for giving a lifelike indication conditionally responsive to an external activity, such as the relative accuracy of the marksmanship or other skill of the operator. In known marksmanship devices wherein a projectile-firing mechanism was utilized in connection with an optically projected moving target, the timing of the position of the image with the coincidence of the projectile was accomplished only by utilizing a large number of electrical contacts or the like in connection with perforations in the photographic film. Such arrangements were difficult to maintain in synchronization and therefore frequently resulted in destruction of the film. The aforementioned arrangements suffered from the additional disadvantage that a toy gun or rifle had to be utilized. Therefore, little of actual experience or training in the use of firearms was gained. As stated heretofore the results of accurate marksmanship were indicated merely by flashing lights, buzzers, or the like, and not by such lifelike indictaion contemplated by the present invention and which is of keen interest to operator and spectators alike of the marksmanship indicating apparatus described herein.

Accordingly an object of the instant invention is to provide a marksmanship or other skill indicating device wherein the results of accurate manipulation thereof are indicated in a lifelike or realistic manner.

Another object of the invention is to provide a movement generating mechanism adapted for use in conjunction with marksmanship indicating apparatus, but aqually adaptable for other applications, said mechanism having means responsive to the relative accuracy of marksmanship for changing from a first image to a second image.

Still another object of the invention is the provision of means associable with marksmanship indicating, or the like apparatus for changing from a first series of optically projected moving images to a second series of such images in response to accurate operation of such apparatus.

A further object of the invention is the provision of efficient means for timing the coincidence of a projected moving image-target with a predetermined spot or aiming point on the screen.

Still another object of the invention is the provision of an image-generating mechanism utilizable in marksmanship or skill indicating apparatus, said mechanism having a number of individually pre-selectable pairs of projectable images and means responsive to accurate exercise of marksmanship or other external activity for successively projecting each image of the pair of images selected.

A still further object of the invention is to provide a marksmanship indicating apparatus capable of projecting imagery exhibiting lifelike or realistic results of accurate marksmanship and adaptable for use with small calibre firearms.

Yet other objects of the invention are the provision in a movement generating mechanism, adaptable for use in marksmanship or like apparatus, of means for projecting the successive images in stereoscopic or illusive three-dimension form; of means coded into the projected image, for example, interspersing colored frames in a black-and-white photographic film, to indicate to the operator of the apparatus the proper instant for manipulating such apparatus, of means for furnishing sounds individually applicable to the successive images and for changing the sounds and images in response to exercise of accurate marksmanship or other external activity.

Other objects and advantages of the invention disclosed herein will readily become apparent during the ensuing description of embodiments thereof adapted for utilization in connection with marksmanship or other skill indicating apparatus, said description presented in conjunction with the accompanying drawings wherein:

Fig. 1 is a schematic perspective view of one illustrative form of the invention adapted for use with marksmanship indicating apparatus.

Fig. 2 is a schematic representation of one form of synchronizing circuit and means including a switching mechanism for manipulating a projecting mechanism to project first and second image series in response to accuracy of marksmanship or other activity.

Fig. 3 is a longitudinal sectional view of another form of switching mechanism adapted for testing skills other than marksmanship.

Fig. 4 is a right-front perspective view on a reduced scale of the housing for the aforesaid projecting mechanism and for one form of means for determining successive images projected thereby, parts having been removed for clarity.

Fig. 5 is sectional elevational view taken from reference plane 5—5 of Fig. 4 showing in detail slidably mounted parts omitted from Fig. 4 and adapted to adjustably limit the dimensions of slot 202 of Fig. 4.

Fig. 6 is a front sectional elevational view of one illustrative form of a projecting and picture changing mechanism constructed in accordance with the principles of the invention, some parts being sectioned and other parts being removed or broken away, for clarity.

Fig. 7 is a rear sectional elevational view of the apparatus of Fig. 6, parts being sectioned and other parts being removed or broken away, for clarity.

Fig. 8 is a left side sectional elevational view of the apparatus of Fig. 6, portions being broken away for clarity.

Fig. 9 is a right side sectional elevational view of the apparatus of Fig. 6, the side wall of housing 122 being partly removed.

Fig. 10 is a sectional plan view taken along line 10—10 of Fig. 7, parts being broken away for clarity.

Fig. 11 is an elevational view of the supporting stirrup 162 of Fig. 6.

Fig. 12 is an elevational view of the Geneva movement 256 of Fig. 6.

Fig. 13 is a longitudinal sectional view taken along line 13—13 of Fig. 12.

Fig. 14 is an exploded view, partly in section, of the film magazine 66 and associated driving mechanism corresponding substantially to Fig. 10.

Fig. 15 is an enlarged, exploded, perspective view of Fig. 14, parts being broken away for clarity.

Fig. 16 is a fragmentary side sectional elevational view taken on the line 16—16 of Fig. 14, but showing the elements assembled as in Fig. 10.

Fig. 17 is a fragmentary elevational view of crossbar 160 and associated mechanism illustrating the desirable inclination thereof.

Fig. 18 is a fragmentary elevational view of another form of magazine construction.

Fig. 19 is a fragmentary top sectional plan view taken along line 19—19 of Fig. 18.

According to one application of the present invention, there is provided in marksmanship or like apparatus means for projecting target imagery upon a screen together with means for changing to successive imagery showing lifelike or realistic results of hitting a predetermined spot on the target imagery with an actual or simulated weapon. The term imagery is intended to include still or motion pictures, black-and-white or colored, two-dimensional or stereoscopic. To further increase the realism of the apparatus it is contemplated that suitable sounds be provided for corresponding pictures of the projected imagery.

Referring now to the drawings and more particularly to Figures 1 and 2, the illustrative embodiment of the invention depicted schematically therein includes optically projecting mechanism, indicated generally by reference character 20, which mechanism is adapted to project successive target imagery upon screen 22. At a selected spot on screen 22, there is disposed an electrical target switch 24 of the push button type having leads 26 and 28 for the purpose of connecting switch 24 to the electrical circuitry shown schematically in Fig. 2. The projecting mechanism 20 is adapted, in one form of the invention, to project a first series of moving images or pictures, for an example a game bird or an airplane in flight and moving across the screen 22 in the course indicated by arrows 30. When the operator of the marksmanship indicating apparatus at a predetermined time accurately fires a pellet-gun or light firearm 32, the pellet or bullet fired, on impact with switch 24 momentarily closes the same to actuate the projecting mechanism 20, in a manner hereinafter fully described, to cause the mechanism 20 to project a second series of moving images, indicated by the arrows 34, and showing realistic or lifelike results of accurate marksmanship, that is to say, a motion picture of the aforesaid game bird or airplane falling to earth.

As better shown in Fig. 2, switch 24 comprises a cover plate 36 mounted flush with screen 22 and hingedly attached to the base plate 38, said cover plate being insulated therefrom by the spacer 40. Threadedly mounted in the base plate 38 is a stud-contact 42, electrical connection being made thereto by means of the lead 26. The circuit is completed through switch 24, at such time when cover plate 36 is depressed inwardly of screen 22, by means of spring-contact 46, electrically connected to lead 28, being pressed into engagement with the stud-contact 42.

The precise instant when the gun or rifle 32 must be fired is predetermined by the single pole double throw cam-switch 50 and the associated cam 52. Cam 52 is rotated by means presently to be described, which causes the rise portion 54 of cam 52 to urge the cam follower contact 56 into electrical contact with the spring-contact 58 of cam switch 50, at the precise moment the target image 30 passes over switch 24. Target-switch 24 and the upper part of cam-switch 50, comprising the contacts 56 and 58, are electrically connected in series with a solenoid 60 and a battery or other source of electrical potential 62. As hereinafter described more fully, solenoid 60 is adapted to operate in association with a plunger 64 which is adapted, through appropriate mechanical linkage, including the plunger-rod 65, to spatially shift the photographic film carrying magazine 66 of the projecting mechanism 20 so that the first series of images 30 projected on the screen 20 will be replaced by the second series 34. It is readily apparent from Fig. 2 that such replacement will be effected only when contacts 42 and 46 of the target switch 24 and contacts 56 and 58 of cam-switch 50 are closed at approximately the same time, thus permitting operation of solenoid 60. In other words the gun or rifle 32 must be accurately fired to hit the cover plate 36 of the target-switch 24 at the instant the target image 30 passes thereover.

The degree of accuracy required for successful operation of the marksmanship apparatus may be predetermined by varying the size of the target-switch cover-plate 36, by varying the length of the rise portion 54 of cam 52, or by changing the speed of the projecting mechanism 20. Failure to hit the target switch 24 with the gun or rifle 32 permits the electrical circuit from battery 62 to solenoid 60 to remain open, and image or picture replacement, therefore, not having taken place, the first series of images, continuing in the direction indicated by arrows 30, passes to the left of switch 24 and off the screen 22, and is then repeated. Various well-known timing or counting mechanism may be utilized in conjunction with the projecting mechanism 20 for determining the allotted number of repetitions of target image 30 and/or for awarding additional repetitions when target-switch 24 is properly hit by the operator of the marksmanship apparatus. Such timing mechanism may desirably be coin- or token-operated.

Upon the momentary and approximately simultaneous closing of screen switch 24 and contacts 56 and 58 of cam switch 50 in response to accurate marksmanship as aforesaid, a timed holding circuit is energized in order to cause the projecting mechanism 20 to continue the projection of the second or replacement series of images indicated by arrows 34.

One form of said holding circuit includes the cam-follower contact 56 and the spring-contact 68 of cam switch 50, which contacts are urged into engagement throughout the low portion 70 of cam 52, by action of the weight 72 attached to the extremity of the cam-follower contact 56. The energization of solenoid 60 as a result of the aforementioned closing of screen switch 24 and contacts 56 and 58 of cam switch 50 causes the bridging member 74 disposed on the plunger-rod 65 to move to the right against the action of spring 75 in order to electrically connect the contacts shown schematically at 76 and 78. An electrical circuit is thereby closed, via the contacts 76 and 78 and the cam-switch contacts 56 and 68, between the battery 62 and the solenoid 60. The said contacts 56, 68, 76, and 78 obviously by-pass the target switch 24 and the upper portion of cam-switch 50 until electrical contact between the cam-follower contact 56 and the spring-contact 68 is interrupted when further rotation of cam 52 brings the rise portion 54 into engagement with the cam follower contact 56. As the electrical holding circuit is thus interrupted, the deenergization of solenoid 60 permits the plunger 64 and the film magazine 66 to be returned to their respective initial positions, by action of the spring 75.

As pointed out hereinbefore, it is contemplated that the marksmanship indicating apparatus of Figures 1 and 2 can be utilized with either a pellet-type simulated rifle or a light firearm, for an example a .22 calibre rifle. In the event the latter is used, it will be necessary to provide, as a covering (not shown) for screen 22 including the target switch cover plate 36, a layer of resilient material of such nature and thickness to prevent ricocheting of bullets impinging on the screen 22. The layer of resilient material is provided with an inexpensive light-reflective covering (not shown) which may be replaced or recovered when required. With this arrangement, actual experience and training in the use of firearms against desirably rapidly moving targets is provided.

In this specification, it is intended that the language "aiming means" include all of the aforementioned actual and simulated weapons, and the like, and aligning switches, for an example hand-switch 80 described herebelow, and that "aiming device" include all pellet- and bullet-firing guns and rifles and the like.

Other manual skills may be tested by means of a hand-switch 80, one embodiment of which is illustrated at Figure 3. Correct operation of switch 80 requires steadiness of hand as well as an ability to detect deviation from a vertical or plumb position. One form of hand-switch 80 comprises a housing 82 shaped to fit in the grasp of the operator's hand, a top cap 84, and a bottom cap 86. Protruding through top cap 84 is a push-button 88 resiliently held in situ by action of the spring 90 bearing against the flange 92 and the spring-retaining member 94. Threaded into the push-button 88 is an electrically conductive rod 96 having affixed thereto a contacting collar 98 and a contacting chain 100, the latter being weighted by means of the metallic bob 102 attached to the lower extremity thereof. Upon downward movement of push-button 88, the contacting collar 98 is brought into engagement with the electrical contact 104 terminating in the electrical lead 106. Simultaneously, the bob 102 is brought into engagement with the contact 108, provided that hand-switch 80 is held by the operator of the skill-testing apparatus in the desired vertical or plumb position during manipulation of the push-button 88. To compensate for manufacturing tolerances and for wear, the contact 108 is mounted on the set-screw 110 threaded into the tapped cylindrical member 112 extending inwardly of bottom cap 86. Electrical connection is made to contact 108 via lead 114. Switch 80 may be inserted in parallel relationship to target switch 24 in the electrical circuitry of Figure 2 by connecting leads 106 and 114 thereof, respectively to the terminals 116 and 118 Fig. 2). By momentarily completing the electrical circuit through the switch 80, said switch cooperates with contacts 56 and 58 of cam switch 50, when the moving projected image 30 reaches a preselected position, to energize solenoid 60 as described heretofore with reference to Figures 1 and 2. The degree of skill required for operation of the apparatus may be increased by providing a stronger spring 90. The greater force then necessitated for the manipulation of hand-switch 80 will render it more difficult for the operator to keep his hand steady and in an upright position as required to make proper contact between the pendulous chain 100 and the contact 108. To minimize the likelihood of the operator's making contact between the bob 102 and contact 108 after the push-button 88 has been depressed, as by tilting switch 80 from side to side or by shaking, chain 100 and weight or bob 102 may be electrically insulated, for an example by coating with enamel, save for the uninsulated portion 120 at the bottom of bob 102. By increasing the length upwardly of contact 108 an electrical circuit through the switch 80, if held properly, can be momentarily completed only as the push-button 88 is being depressed. In the fully depressed condition of push-button 88 electrical contact between the uninsulated portion 120 and the contact 108 is prevented, although the switch 80 is tilted from side to side, by the surrounding insulated portions of bob 102. Although switch 80 has been illustrated as having contacts adapted to be closed only in the vertical position of housing 82, obviously any other position may be selected upon spatial rearrangement of contacting chain 100 and contact 108, relative to the housing 82.

One form of projecting mechanism 20 adapted for use with the marksmanship apparatus illustrated in Figures 1 and 2 is depicted more fully in Figures 6 to 10 inclusive. Said projecting mechanism includes a housing 122, perspectively shown in Fig. 4 and having a base 123 and a first compartment 124 in which there is mounted a projector-lamp 126 and reflector 127 therefor. The compartment 124 is provided with vents 128 and 130 for purposes of cooling the lamp 126. The housing 122 is further divided into a second compartment 132 which partially encloses the driving motor 134 and a third compartment 136 which encloses the solenoid 60 mounted on the top wall of compartment 136 by means of bracket 138. Base 123 is furnished with adjusting bolts 139 to aid in aligning projecting mechanism 20 relative to a screen, for an example target screen 22 (Fig. 1). A carrying handle 140, provided for housing 122, is supported by the standards 142 and 144.

Mounted in alignment with a lens opening 146 of compartment 124 and adjacent the projector-lamp 126 is an optical condensing lens system indicated generally by the reference character 148. An optical objective lens system indicated generally at 150 is spacedly mounted in axial alignment with the condensing lens system 148, by means of the base plate 152 attached thereto and swingingly fastened to the standard 144 by means of the hinge 154. The objective lens system 150 and the base plate 152 are secured in operative position through the use of the L-shaped bracket 156 and locking screw 158 threaded therein.

The photographic film or transparency carrying magazine 66 is slidably mounted on the crossbar 160, utilizing a stirrup 162, shown in greater detail in Fig. 11. Crossbar 160 is adjustably supported by the standards 142 and 164, and its inclination (Fig. 17) is made variable by providing standard 164 with a set screw 166 and a suitably disposed spring (not shown). A portion of the magazine 66 adjacent the periphery thereof passes between the objective lens system 150 and the condenser lens system 148. As described more fully hereinafter, a plurality of concentric motion-picture film bands indicated at 168 and 170 are disposed adjacent the periphery of magazine 66. In the case of two dimensional motion pictures, two film bands are utilized as illustrated in Figures 6 and 7 For the projection of stereoscopic, or illusive three-dimensional images, two pairs of photographic film bands (not shown) can be utilized in place of the bands 168 and 170.

A duo-positional light gate 172 (Fig. 6) having a single opening 174 for two dimensional projection and a pair of "Polaroid" filters 176 ad 178 for imparting differential polarization, in a well-known manner, to corresponding left- and right-eye images, indicated respectively by the broken lines 180 and 182 (Fig. 10). The left and right images are properly directed toward screen 22 (Fig. 1) for an example, by the stereoscopic reflector 184 (Fig. 10). Such devices are well-known, and accordingly a more detailed description is dispensed with. The light gate 172 is pivotally mounted and resiliently held against the opening 146 of the projector housing 122 through use of the spring 186 and the associated stud portion 188. A lever 190 is utilized to move the light gate 172 to the desired position thereof wherein it is secured by spring means 192 cooperating with notches 194 provided for that purpose on the light gate 172.

In order to selectively project pictures from either of the film bands 168 and 170, or from one of the aforesaid pairs of stereoscopic film bands, displacing mechanism is provided for shifting the film magazine 66 laterally on the crossbar 160 to bring one of the film bands 168 or 170 in alignment with the optical axis of the lens systems 148 and 150 and opening 174 of light gate 172, in the case of two dimensional projection. Since the individual frames or transparencies 196 and 198 of the respective motion picture bands 168 and 170 are desirably disposed alternately relative to one another, that is to say, one-half frame apart, the crossbar 160 is inclined (as better shown in Fig. 17) in order to bring either of the pictures 196 and 198 into proper alignment with the lens systems 148 and 150 and light gate opening 174 when the magazine 66 is shifted, in response to accurate operation of the marksmanship or other skill testing apparatus as already fully described in connection with Figures 1 to 3. It will be appreciated that the angle 199 of inclination is such that when the film magazine 66 is shifted as aforesaid the alternately disposed frames 196 and 198, respectively, will become properly aligned with the opening 174 in light gate 172. The angle 199 is adjusted or varied, as pointed out heretofore, by means of set screw 166.

Referring now particularly to Figures 6 and 7, one form of the aforementioned displacing mechanism illustrated therein includes the solenoid 60 having suitable electrical leads (not shown) for interconnection with electrical circuitry such as that illustrated in Fig. 2 and a plunger 64. The film magazine 66 supporting means or stirrup 162 terminates in the tab 200 protruding through slot 202 formed in the top wall of compartment 122 and fastened to plunger 64 by means of pin 204. The stirrup 162 is normally urged laterally in the direction of lens opening 146 by the biasing spring 75 disposed between the collar 206 attached to plunger 64 and the spring plate 208 of solenoid 60. Upon the energization of solenoid 60, effected by the momentary closing of switch contacts 42, 46 and 56, 58, as heretofore described in connection with Figures 1 and 2, the bridging member 74 mounted on the plunger rod 65 moves leftward (Fig. 6) with plunger 64 to electrically connect contacts 76 and 78 of the aforementioned holding circuit (Fig. 2).

In order to determine the extent of lateral movement or throw of the stirrup 162 and the associated film magazine 66 and to facilitate vertical alignment of magazine 66 relative to the optical axis of the lens systems 148 and 150, means are provided for adjustably constricting the dimensions of slot 202 formed in housing 122. As better shown in Figures 5 and 6 an exemplary form of such adjustable constricting means includes the aligning bars 210 and 212 attached to the top wall of compartment 136 on either side of slot 202 and adjustable laterally thereof, by means of suitably placed mounting bolts and adjusting slots indicated generally at 214. It will be apparent that aligning bars 210 and 212 cooperate with stirrup tab 200, within the limits of slot 202, to vertically adjust the stirrup 162 and film magazine 66. The throw of stirrup 162 and the associated tab 200 is variably limited by adjusting means 216 and 218 movably attached, adjacent the respective ends of slot 202, to the guide bar 212 by means of the mounting bolt and slot arrangements indicated generally at 220. It will be appreciated that the extent of adjustability of adjusting means 216 and 218 is sufficient to permit not only a fine adjustment of motion picture frames 196 of film band 168 and of frames 198 of film band 170 relative to the light gate opening 174, but also to permit the greater throw or lateral movement of stirrup 162 and film magazine 66 necessitated in the case where stereoscopic projection, requiring additional film bands, is utilized.

One form of film magazine 66, including associated controlling and driving mechanism, and constructed in accordance with the principles of the invention is illustrated particularly in Figures 6, 7, 14 and 15. Magazine 66 includes a desirably plastic shutter disc 222 having a metallic insert 223 for purposes hereinafter made more apparent and a picture or film disc 224 having a photographic transparency or film 226 affixed thereto and desirably coextensive therewith. The transparency 226 includes the film bands 168 and 170 or multiple film bands in the case of stereoscopic projection. Film disc 224 and transparency 226 are adapted to fit within the recess 228 of the shutter disc 222 and are secured against relative rotation thereto by stud 230 cooperating with aperture 232 of film disc 224. The shutter disc 22 having the film disc 224 and photographic transparency 226 inserted therein is rigidly mounted on axle 234 by the shrink fitting of insert 223 on said axle. The aforementioned parts 222, 224, and 226 are adapted to rotate within the retaining member 235 attached to stirrup 162 and are clamped together by means of the clamping plate 236 and removably secured against relative axial displacement between collar portion 238 of axle 234 and the milled nut 240 applied to the threaded portion of said axle. The film disc 224, shutter disc 222, and associated parts, and axle 234 are rotatably mounted on stirrup 162 (Fig. 10) whereby the collar portion 238 extends within the hub 242 of stirrup 162 (Fig. 11). Film transparency 226 may be provided with phonographic grooves 243 and 245 or the like (Fig. 14) for recording sounds appropriate to film series 168 and 170, respectively. Suitable sound pick-up means (not shown) may be utilized to engage grooves 243 and 245, or the like, upon lateral movement of magazine 66 and associated film transparency 226.

For each picture or frame 196 or 198 (Figs. 6 and 7) of the film bands 168 and 170, a corresponding aperture or opening 244 or 246, respectively, is provided in the shutter disc 222, as by molding. The sides 248 of each opening 244 or 246 are desirably inclined outwardly toward film disc 224 in order to better direct light rays from the condensing lens system 148 toward and through the associated picture of frame 196 or 198. Alternatively, shutter disc 222 may comprise a disc (not shown) of transparent plastic, for example that known commercially as "Lucite" or "Plexiglas," having an opaque coating thereon save for openings in said coating corresponding position-wise to the apertures 244 and 246 of shutter disc 222. The aforesaid apertures 244 and 246 are alignable with opening 250 of retaining member 235 upon rotation of shutter disc 222 and are alternately alignable with light gate opening 174 upon laterally shifting stirrup 162 and film magazine 66 by means of solenoid 60 as described heretofore.

To determine precisely when magazine 66 can be shifted laterally by operation of solenoid 60, the cam 52, shown schematically at Fig. 2, is attached to shutter disc 222. The rise portion 54 of cam 52 may cooperate with screw 54a shown in Figure 2 or may itself comprise a screw as illustrated in Figure 16. In either case the screws are adjustable in the usual manner and lock nuts can be used to fix their position. Cam 52 is so orientated that the rise portion 54 thereof closes contacts 56 and 58 of switch 50 momentarily, near the end of the motion picture series of frames comprised by one of the film bands 168 and 170. At that time, if switch 24 or 80 is successfully closed, film magazine 66 is shifted laterally by operation of solenoid 60, as described in connection with Figures 2 and 3, such that projection of the other of said film bands 168 or 170 is commenced. The elements of switch 50 are mounted within switch cover 252 fastened to the back surface of retaining member 235, the spatial arrangement of which is illustrated in Fig. 7. The cam follower contact 56 protrudes through a suitably placed aperture (not shown) in retaining member 235 to make bearing contact with cam 52. Obviously cam 52 may be orientated to obtain some other timing relationship between bands 168 or 170.

It is well-known that motion picture transparencies of film must be fed to the projecting means in an intermittent or stepwise motion to take advantage of the image retentional phenomenon of the human retina. One arrangement for imparting an intermittent motion to the revolving shutter disc 222 and film disc 224, comprises the driving gear 254 rigidly attached to axle 234 and the Geneva movement 256 (Figs. 12 and 13) operative to rotate gear 254 in an intermittent manner. The Geneva movement 256, enclosed within the housing 258 and cover plate 260 fastened to stirrup 162, includes a driver 262 loosely and rotatably mounted on hub 264 of driving gear 254 in driving relationship with the star wheel 266 also arranged within housing 258 on shaft 168. The intermittent motion of star wheel 266 is transferred to driving gear 254 through spur gear 270 likewise affixed to shaft 268.

The Geneva movement 256 is actuated by means of the pulley arrangement 272 mounted on hub 274 of driver 262 which hub protrudes through housing 258. To permit the aforedescribed lateral shifting of stirrup 162 and magazine 66, the pulley arrangement 272 is coupled by means of an elastic belt such as spring 275 to a similar pulley arrangement 276 mounted on shaft 278 of motor 134. The pulley arrangements 272 and 276 each desirably comprise a pair of differently sized pulleys adapted to rotate magazine 66 at the required speed for two dimensional projection and at a different required speed for stereoscopic projection. Pulley arrangement 272 is provided with a handle 280 for manually moving magazine 66, if desired. The aforedescribed parts are maintained in their proper positions on the axle 234 by the washer 277 and the bolt 279.

Alternatively, it is contemplated that pairs of still photographic transparencies be successively projected in place of the first and second series of motion pictures comprising the bands 168 and 170 (Fig. 6). One arrangement for manually selecting the desired pairs of stills to be successively projected is illustrated in Figures 18 and 19. In the latter figures film magazine 300 is illustrated. Magazine 300 comprises the following elements: disc 304, stereo-disc 306, axle 308 and nut 310. All except stereo-disc 306 are identical with the corresponding elements illustrated in Figure 14 and described heretofore. The stereo-disc, however, does not seat in recess 312 and is of larger diameter than the disc 224 which seats in recess 228 (see Fig. 14).

Stereo-disc 306 extends outwardly of the periphery of retaining member 302 and is provided with detent means comprising notches 314 and leaf spring 316 which is mounted on retaining member 302. The leaf spring resiliently restrains the disc in a selected position. Notches 314 are correlated with film transparencies mounted on the disc in pairs as indicated at 318 and 320 to position the pairs in alignment with a lens system 322–324 and prisms 326, 328 and 330 in accordance with the desired selection.

The magazine of Figures 18 and 19 differs in another respect from that of Figure 14 in that stereo-disc 306 is rotatably mounted on hub 332 of axle 308 and not clamped by plate 334. The latter plate is identical with plate 236.

With the stereo-disc 306 held stationary by the detent means the shutter can be revolved so its apertures 338, 340 alternately illuminate the film transparencies 318–320 by covering and uncovering each picture in turn. The stereo pictures are then projected alternately and superimposed upon the screen by means of prisms 326, 328, 330 and suitable filters, and may be viewed through a pair of polarized spectacles so each eye will see only the proper picture and the stereoscopic effect be obtained.

A variety of sequential target images may be utilized with the disclosed marksmanship apparatus. For examples: in the case of motion pictures, target images of game birds or airplanes in flight, and the like, may be projected, followed by scenes of the target falling earthward after a hit is scored. Where stereoscopically projected motion images are utilized, pictures of wild animals, apparently charging from the screen toward the operator of the herein disclosed apparatus will furnish entertainment for operator and spectators alike. For greater realism, film magazine 66, utilized for projecting motion pictures may be provided with a pair of sound tracks (not shown) respectively for each film band 168 or 170 and capable of generating sounds appropriate to said film bands.

Although the invention has been described herein with reference to marksmanship indicating apparatus, it is obvious that the invention is readily adaptable to other applications wherein a successive projection of first and second image series is made conditionally responsive to an external situation or activity. In particular, the disclosed projecting mechanism can readily be adapted for advertising purposes and the like wherein a quick and efficient change from a first to a second image series is desirable.

In addition to the several exemplary forms of the present invention illustrated herein, other arrangements and embodiments of the invention will occur to those skilled in the art, without departing from the spirit and scope thereof. Furthermore, it is to be understood that certain features of the invention can be utilized without a corresponding use of other features.

Accordingly what is claimed as new is:

1. In a skill indicating apparatus, a light-reflective screen; operable aiming means capable of movement to a predetermined position of alignment relative to said screen; projecting mechanism for projecting first and second images upon said screen, said mechanism including a lens and a movably mounted magazine adapted for carrying first and second photographic films corresponding to said first and second images; a first means operable to move said magazine from a position of image projecting relationship of said lens relative to said first film to a position of image projecting relationship of said lens relative to said second film; and a second means associated with said aiming means and responsive to operation of said aiming means at said predetermined position, for activating said first means.

2. In a skill indicating apparatus; a light-reflective screen; operable aiming means capable of movement to a predetermined position of alignment relative to said screen; projecting mechanism for projecting first and second images upon said screen, said mechanism including a lens and a movably mounted magazine adapted for carrying first and second photographic films corresponding to said first and second images; electrical means associated with said magazine for moving said magazine from a position of image projecting relationship of said lens relative to said first film to a position of image projecting relationship of said lens relative to said second film; electrical circuitry arranged to supply electric potential to said electrical means; and at least one switch connected in said circuitry, said switch having contacts arranged to be closed by operation of said aiming means at said predetermined position of alignment.

3 In a skill indicating apparatus; a light-reflective screen; operable aiming means capable of movement to a predetermined position of alignment relative to said screen; projecting mechanism for projecting first and second images upon said screen, said mechanism including a lens and a movably mounted magazine adapted for carrying first and second photographic films corresponding to said first and second images; electrical means associated with said magazine for moving said magazine from a position of image projecting relationship of said lens relative to said first film to a position of image projecting relationship of said lens relative to said second film; electrical circuitry arranged to supply electric potential to said electrical means; at least one switch connected in said circuitry, said switch having contacts arranged to be closed by operation of said aiming means at said predetermined position of alignment; a biasedly open switch connected in said circuitry in series relationship to said first-named switch; means for intermittently closing said biasedly open switch; and warning means for indicating said closing.

4. A skill indicating apparatus comprising a light-reflective screen; an operable aiming device capable of movement to a predetermined position of alignment relative to said screen; projecting mechanism for projecting first and second images upon said screen, said mechanism including a lens and a movably mounted magazine adapted for carrying first and second photographic films corresponding to said first and second images; electrical means associated with said magazine for moving said magazine from a position of image projecting relationship of said lens relative to said first film to a position of image projecting relationship of said lens relative to said second film; electrical circuitry arranged to supply electric potential to said electrical means; and a biasedly open switch connected in said circuitry and mounted on said screen in alignment with said predetermined position, said switch being arranged to be closed by operation of said aiming device at said predetermined position of alignment.

5. A skill indicating apparatus comprising a light-reflective screen; an operable aiming device capable of movement to a predetermined position of alignment relative to said screen; projecting mechanism for projecting first and second images upon said screen, said mechanism including a lens and a movably mounted magazine adapted for carrying first and second photographic films corresponding to said first and second images; electrical means associated with said magazine for moving said magazine from a position of image projecting relationship of said lens relative to said first film to a position of image projecting relationship of said lens relative to said second film; electrical circuitry arranged to supply electric potential to said electrical means; and a biasedly open switch connected in said circuitry and mounted on said screen in alignment with said predetermined position, said switch being ararnged to be closed by operation of said aiming means at said predetermined position of alignment; a biasedly open switch connected in said circuitry in series relationship to said first-named switch; means for intermittently closing said biasedly open switch; and warning means for indicating said closing.

6. A skill indicating apparatus comprising a light-reflective screen; operable aiming means capable of movement to a predetermined position of alignment relative to said screen; projecting mechanism for projecting first and second images upon said screen, said mechanism including a lens and a movably mounted magazine adapted for carrying first and second photographic films corresponding to said first and second images and an electrical solenoid having a plunger attached to said magazine, said solenoid being operable to effect movement of said magazine from a position of image projecting relationship of said lens relative to said first film to a position of image projecting relationship of said lens relative to said second film; an electrical circuit connecting said solenoid to a source of electric potential; at least one biasedly open switch connected in said circuit and adapted to be momentarily closed by operation of said aiming means at said predetermined position of alignment; a second biasedly open switch connected in said circuit in series relationship to said first-named switch; means for intermittently closing said second switch; warning means for indicating said closing; and electrical holding means energized by movement of said plunger for supplying electric potential to said solenoid only during an interval between successive closings of said second switch.

7. A skill indicating apparatus comprising a light-reflective screen; operable aiming means capable of movement to a predetermined position of alignment relative to said screen; projecting mechanism for projecting first and second images upon said screen, said mechanism including a lens and a movably mounted magazine adapted for carrying first and second photographic films corresponding to said first and second images, and an electrical solenoid having a plunger attached to said magazine and operable to effect movement thereof from a position of image projecting relationship of said lens relative to said first film to a position of image projecting relationship of said lens relative to said second film; a first electrical circuit connecting said solenoid to a source of electric potential; at least one biasedly open switch connected in said first circuit and adapted to be momentarily closed by operation of said aiming means at said predetermined position of ailgnment; a second biasedly open switch connected in said first circuit in series relationship to said first-named switch; a second electrical circuit connecting said solenoid to said source and by-passing said first circuit; a pair of electrical terminals associated with said solenoid and connected in said second circuit; a bridging member mounted on said plunger, said bridging member being arranged to connect said terminals upon energization of said solenoid; a biasedly closed switch connected in said second circuit in series relationship to said terminals, a single means for intermittently closing said second biasedly open switch and for intermittently opening said biasedly closed switch; and warning means indicating said intermittent closing and opening, respectively, of said second switch and of said biasedly closed switch.

8. A skill indicating apparatus comprising a light-reflective screen; operable aiming means capable of movement to a predetermined position of alignment relative to said screen; motion picture projecting mechanism for projecting first and second series of moving target images upon said screen, said mechanism including a lens and a rotatably mounted and laterally movable film magazine adapted for carrying first and second series of photographic films corresponding to said first and second moving target images; electrical means associated with said magazine for laterally moving said magazine from a position of image projecting relationship of said lens relative to said first film series to a position of image projecting relationship of said lens relative to said second film series; electrical circuitry arranged to supply electric potential to said electrical means; at least one switch connected in said circuitry, said switch having contacts arranged to be closed by operation of said aiming means at said predtermined position of alignment; a biasedly open switch connected in said circuitry in series relationship to said first-named switch; cam means for intermittentently closing said biasedly open switch, said cam means being mounted on said film magazine in orientated relationship therewith, whereby the position of said first moving image relative to said screen indicates the closing of said biasedly open switch; and means for rotating said film magazine and said cam means.

9. In a marksmanship indicating apparatus; a light-reflective screen; electrical circuit closing means mounted on said screen, said means being biased to an open circuit position, an aiming device operable to actuate said circuit closing means; projecting mechanism for projecting first and second images upon said screen, said mechanism including a lens and a movably mounted magazine adapted for carrying first and second photographic films corresponding to said first and second images; electrical means associated with said magazine for moving said magazine from a position of image projecting relationship of said lens relative to said first film to a position of image projecting relationship of said lens relative to said second film; electrical circuitry arranged to supply electric potential to said electrical means; and means for connecting said circuit closing means in said circuitry.

10. In a marksmanship indicating apparatus; a light-reflective screen; electrical circuit closing means mounted on said screen, said means being biased to an open circuit position; an aiming device operable to actuate said circuit closing means; projecting mechanism for projecting first and second images upon said screen, said mechanism including a lens and a movably mounted magazine adapted for carrying first and second photographic films corresponding to said first and second images; electrical means associated with said magazine for moving said magazine from a position of image projecting relationship of said lens relative to said first film to a position of image projecting relationship of said lens relative to said second film; electrical circuitry arranged to supply electric potential to said electrical means; means for connecting said circuit closing means in said circuitry; a biasedly open switch connected in said circuitry in series relationship to said circuit closing means; means for intermittently closing said switch; and warning means for indicating said closing.

11. In a marksmanship indicating apparatus; a light-reflective screen; electrical circuit closing means mounted on said screen, said means being biased to an open circuit position; an aiming device operable to actuate said circuit closing means; projecting mechanism for projecting first and second moving target images upon said screen, said mechanism including a lens and a rotatably mounted and laterally movable film magazine adapted for crrying first and second series of photographic films corresponding to said first and second moving target images; electrical means associated with said magazine for laterally moving said magazine from a position of image projecting relationship of said lens relative to said first film series to a position of image projecting relationship of said lens relative to said second series; electrical circuitry arranged to supply electric potential to said electrical means; and means for connecting said circuit closing means in said circuitry.

12. A marksmanship indicating apparatus comprising a light-reflective screen; electrical circuit closing means mounted on said screen, said means being biased to an open circuit position; an aiming device operable to actuate said circuit closing means; projecting mechanism for projecting first and second moving target images upon said screen, said first and second moving images being arranged for movement toward and away from, respectively, said circuit closing means, said mechanism including a lens and a rotatably mounted and laterally movable film magazine adapted for carrying first and second series of photographic films corresponding to said first and second moving target images; electrical means associated with said magazine for laterally moving said magazine from a position of image projecting relationship of said lens relative to said first film series to a position of image projecting relationship of said lens relative to said second film series; electrical circuitry arranged to supply electric potential to said electrical means; means for connecting said circuit closing means in said circuitry; a biasedly open switch connected in said circuitry in series relationship to said circuit closing means; cam means for intermittently closing said switch, said cam means being mounted on said film magazine and orientated therewith relative to the rotary position of said magazine when said first moving image reaches a predetermined position relative to said circuit closing means, whereby said closing of said switch is indicated.

13. A marksmanship indicating apparatus adapted for use with light firearms, said apparatus comprising a screen; a biasedly open screen switch mounted on said screen, said switch having a protective cover plate flushedly arranged relative to said screen; a bullet-absorbing material covering said screen and said cover plate; a light-reflecting material covering said absorbing material; projecting mechanism for projecting first and second images upon said light-reflecting material, said mechanism including a lens and a movably mounted magazine adapted for carrying first and second photographic films corresponding to said first and second images; electrical means associated with said magazine for moving said magazine from a position of image projecting relationship of said lens relative to said first film to a position of image projecting relationship of said lens relative to said second film; electrical circuitry arranged to supply electric potential to said electrical means; means for electrically connecting said screen switch in said circuitry; a second biasedly open switch connected in said circuitry in series relationship to said first-named switch; means for intermittently closing said second switch; and warning means for indicating said closing.

14. In a skill indicating apparatus adapted for use with an operable aiming means capable of movement to predetermined position of alignment relative to a light-reflective screen; projecting mechanism for projecting first and second images upon said screen, said mechanism including a light source and optical lens system, a rotatably mounted substantially circular film magazine capable of supporting at least one photographic film band corresponding to each of said images and disposed adjacent the periphery of said magazine, said magazine being arranged for lateral movement whereby said film bands are brought alternatively within the image projecting field of said lens, means for rotating said magazine, and means for laterally moving said magazine in response to operation of said aiming means at said predetermined position of alignment.

15. In a skill indicating apparatus adapted for use with an operable aiming means capable of movement to predetermined position of alignment relative to a light-reflective screen; projecting mechanism for projecting first and second moving target images upon said screen, said mechanism including a light source and lens system, a rotatably mounted substantially circular film magazine capable of supporting at least one series of photographic film frames corresponding to each of said first and second images and disposed adjacent the periphery of said magazine, said magazine having series of holes corresponding to said frames and arranged for lateral movement whereby each of said series of film frames is brought alternatively within the image projecting field of said lens, a duopositional light gate pivotally mounted adjacent said projecting field, said light gate including a single slot alignable with said frames at a first position of said light gate and a pair of slots having differentially polarizing light filters respectively mounted therein and alignable with said frames at a second position of said light gate, means for effecting stepwise rotation of said magazine, and means for laterally moving said magazine in response to operation of said aiming means at said predetermined position of alignment.

16. A skill indicating apparatus comprising a light-reflective screen; operable aiming means capable of movement to a predetermined position of alignment relative to said screen; projecting mechanism for projecting a plurality of pairs of first and second images upon said screen, said mechanism including a rotatably mounted and laterally movable substantially circular film magazine having a plurality of pairs of photographic transparencies corresponding to said pairs of images and radially disposed adjacent the periphery of said magazine, a Geneva movement operable to effect stepwise rotation of said magazine, electrical driving means for driving said Geneva movement, a first circuit for supplying electric potential to said driving means, a biasedly closed limit switch connected in said circuit and arranged to be opened by said Geneva movement after one index thereof, an electrical solenoid having a plunger attached to said magazine, said solenoid being operable to effect lateral movement of said magazine from a first position of image projecting relationship relative to a first of one of said pairs of transparencies to a second position of image projecting relationship relative to a second of one of said pairs of transparencies, and biasing means operative to urge said magazine to said first position; a second electrical circuit connecting said solenoid to a source of electric potential; a biasedly open switch connected in said second circuit and adapted to be momentarily closed by operation of said aiming means at said predetermined position of alignment; a second biasedly open switch connected in said second circuit in series relationship to said first-named switch; cam means for intermittently closing said second switch; warning means for indicating said closing; electrical holding means energized by movement of said plunger for supplying electric potential to said solenoid only during an interval between successive closings of said second switch; biasedly open switching means connected in said first circuit in parallel relationship to said limit switch, said switching means being coupled to said holding means and arranged to be closed by energization of said holding means; a third biasedly open switch connected in said first circuit in series relationship with said switching means and in parallel relationship with said limit switch, said third switch being intermittently closed by said cam means, whereby, if said aiming means is properly operated to effect movement of said magazine from said first position to said second position, said magazine is indexed to bring an adjacent pair of transparencies into image projecting relationship.

17. In a skill indicating apparatus; a light-reflective screen; operable aiming means capable of movement to a predetermined position of alignment relative to said screen; projecting and sound generating mechanism for projecting first and second series of moving images upon said screen and for generating sounds appropriate, respectively, to said first and second images, said mechanism including a rotatably mounted and laterally movable film magazine, a photographic film transparency mounted on said magazine, said transparency having first and second film series corresponding to said first and second images and first and second sound tracks corresponding to said first and second film series; electrical means operably associated with said magazine for laterally moving said magazine from a position of image projecting and sound generating relationship relative to said first film and sound track to a position of image projecting and sound generating relationship relative to said second film and sound track; sound pick-up means arranged to engage successively said first and second sound tracks upon lateral movement of said magazine; electrical circuitry arranged to supply electric potential to said electrical means; and at least one switch connected in said circuitry, said switch having contacts arranged to be closed by operation of said aiming means at said predetermined position of alignment.

References Cited in the file of this patent

UNITED STATES PATENTS

| | | |
|---|---|---|
| 1,120,577 | Wiese | Dec. 8, 1914 |
| 1,207,411 | Keen | Dec. 5, 1916 |
| 1,236,819 | Bulask | Aug. 14, 1917 |
| 1,410,029 | Niell | Mar. 21, 1922 |
| 1,563,551 | Bulask | Dec. 1, 1925 |
| 1,788,808 | Stein | Jan. 13, 1931 |
| 1,856,956 | Jordan | May 3, 1932 |
| 2,405,706 | Musebeck | Aug. 13, 1946 |
| 2,542,188 | Gates | Feb. 20, 1951 |
| 2,582,013 | France | Jan. 8, 1952 |
| 2,683,390 | Steele | July 13, 1954 |